US011308863B2

(12) United States Patent
Kwon et al.

(10) Patent No.: US 11,308,863 B2
(45) Date of Patent: Apr. 19, 2022

(54) TIMING CONTROLLER FOR CONTROLLING EMISSION OF EMISSION ELEMENT FOR RECOGNIZING TOUCH COORDINATES AND ELECTRONIC DEVICE INCLUDING THE SAME

(71) Applicant: SILICON WORKS CO., LTD., Daejeon (KR)

(72) Inventors: You Jin Kwon, Daejeon (KR); Sang Kwon Kim, Daejeon (KR); Chang Sung Hong, Daejeon (KR); Pyeong Keun Oh, Daejeon (KR); Jun Ho Kwak, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/169,667

(22) Filed: Feb. 8, 2021

(65) Prior Publication Data

US 2021/0248953 A1 Aug. 12, 2021

(30) Foreign Application Priority Data

Feb. 10, 2020 (KR) .................. 10-2020-0015676

(51) Int. Cl.
*G09G 3/32* (2016.01)
*G06F 3/0354* (2013.01)
*G06F 3/041* (2006.01)

(52) U.S. Cl.
CPC ........... *G09G 3/32* (2013.01); *G06F 3/03542* (2013.01); *G06F 3/0416* (2013.01); *G09G 2310/027* (2013.01); *G09G 2310/08* (2013.01)

(58) Field of Classification Search
CPC . G06F 3/03542; G06F 3/0386; G09G 3/3258; G09G 3/3291
(Continued)

(56) References Cited

U.S. PATENT DOCUMENTS 6,377,249 B1 * 4/2002 Mumford ............ G06F 3/03542
345/173
10,694,139 B2 * 6/2020 Bae ........................ G09G 3/36
(Continued)

FOREIGN PATENT DOCUMENTS

KR 10-0424383 B1 3/2004
KR 10-2013-0003840 A 1/2013

*Primary Examiner* — Calvin C Ma
(74) *Attorney, Agent, or Firm* — Harness, Dickey & Pierce, P.L.C.

(57) ABSTRACT

Disclosed is a timing controller including a coordinate data generation circuit configured to generate X coordinate emission data for acquiring X coordinates and Y coordinate emission data for acquiring Y coordinates of the touch coordinates, a selection circuit configured to time-divide 1 frame duration, to output image data to a display driving circuit during a display field, to output the X coordinate emission data to the display driving circuit during an X coordinate field, and to output the Y coordinate emission data to the display driving circuit during a Y coordinate field, and a control data generation circuit configured to generate source control data and gate control data for outputting the image data, the X coordinate emission data, and the Y coordinate emission data to a display panel and to output the source control data and the gate control data to the display driving circuit.

20 Claims, 11 Drawing Sheets

(58) Field of Classification Search
USPC .................................................. 345/174, 690
See application file for complete search history.

(56) References Cited

U.S. PATENT DOCUMENTS

| 2014/0062973 | A1* | 3/2014 | Origuchi | G09G 5/00 |
| | | | | 345/179 |
| 2018/0166507 | A1* | 6/2018 | Hwang | G06F 3/0445 |

* cited by examiner

TIMING CONTROLLER FOR CONTROLLING EMISSION OF EMISSION ELEMENT FOR RECOGNIZING TOUCH COORDINATES AND ELECTRONIC DEVICE INCLUDING THE SAME

CROSS-REFERENCE TO RELATED APPLICATION

This application claims the benefit of Korean Patent Application No. 10-2020-0015676, filed on Feb. 10, 2020, which is hereby incorporated by reference as if fully set forth herein.

FIELD

The present disclosure relates to a display device, and more particularly to a display device for recognizing touch coordinates.

BACKGROUND

Along with the development of the information age, demands for display devices have increased in various forms. Recently, various types of display devices such as a liquid crystal display device (LCD) or an organic light emitting display device (OLED) have been used.

Recently, a display device including a touch screen panel for detecting a touch input through a user's finger, a stylus pen, or the like instead of a general input method such as a button, a key board, or a mouse has been widely used. Most of display devices including a touch screen panel need to include a touch sensing device or a touch integrated circuit (IC) for accurately detecting whether there is a touch or touch coordinates (or a touch position).

That is, a general display device requires a touch sensing device or a touch IC as well as a separate touchscreen panel in order to detect a touch input through a user's finger, a stylus pen, or the like, and accordingly, there is a problem in that a manufacturing process of a display device is complicated and manufacturing costs of the display device is also inevitably increased.

SUMMARY

Therefore, the present disclosure has been made in view of the above problems, and it is an object of the present disclosure to provide a timing controller and an electronic device including the same for sensing touch coordinates of a pen that comes into contact with a display panel using light emitted from a self-emission element included in a pixel of a display panel.

The present disclosure may also provide a timing controller and an electronic device including the same for outputting emission data for acquiring touch coordinates of a pen that comes into contact with a display panel and image data for displaying an actual image by time-dividing 1 frame duration.

The present disclosure may also provide a timing controller and an electronic device including the same for varying the number of pixels supposed to emit light to acquire touch coordinates depending on the resolution and coordinate precision value of a display panel.

The present disclosure may also provide a timing controller and an electronic device including the same for allowing a pixel supposed to emit light with random color to acquire touch coordinates.

In accordance with an aspect of the present disclosure, the above and other objects can be accomplished by the provision of a timing controller for controlling emission of an emission element for recognizing touch coordinates, including a coordinate data generation circuit configured to generate X coordinate emission data for acquiring X coordinates and Y coordinate emission data for acquiring Y coordinates of the touch coordinates, a selection circuit configured to time-divide 1 frame duration, to output image data to a display driving circuit during a display field, to output the X coordinate emission data to the display driving circuit during an X coordinate field, and to output the Y coordinate emission data to the display driving circuit during a Y coordinate field, and a control data generation circuit configured to generate source control data and gate control data for outputting the image data, the X coordinate emission data, and the Y coordinate emission data to a display panel and to output the source control data and the gate control data to the display driving circuit.

In accordance with another aspect of the present disclosure, there is provided an electronic device including a display panel including a plurality of pixels, a timing controller configured to time-divide 1 frame duration, to generate X coordinate emission data for acquiring X coordinates of touch coordinates and first control data during an X coordinate field, to generate Y coordinate emission data for acquiring Y coordinates and second control data during a Y coordinate field, and to generate third control data for outputting image data input from an outside during a display field, and a display driving circuit configured to allow the pixel to emit light based on the X coordinate emission data according to the first control data during the X coordinate field, to allow the pixel to emit light based on the Y coordinate emission data according to the second control data during the Y coordinate field, and to allow the pixel to emit light based on the image data according to the third control data during the display field.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1A:
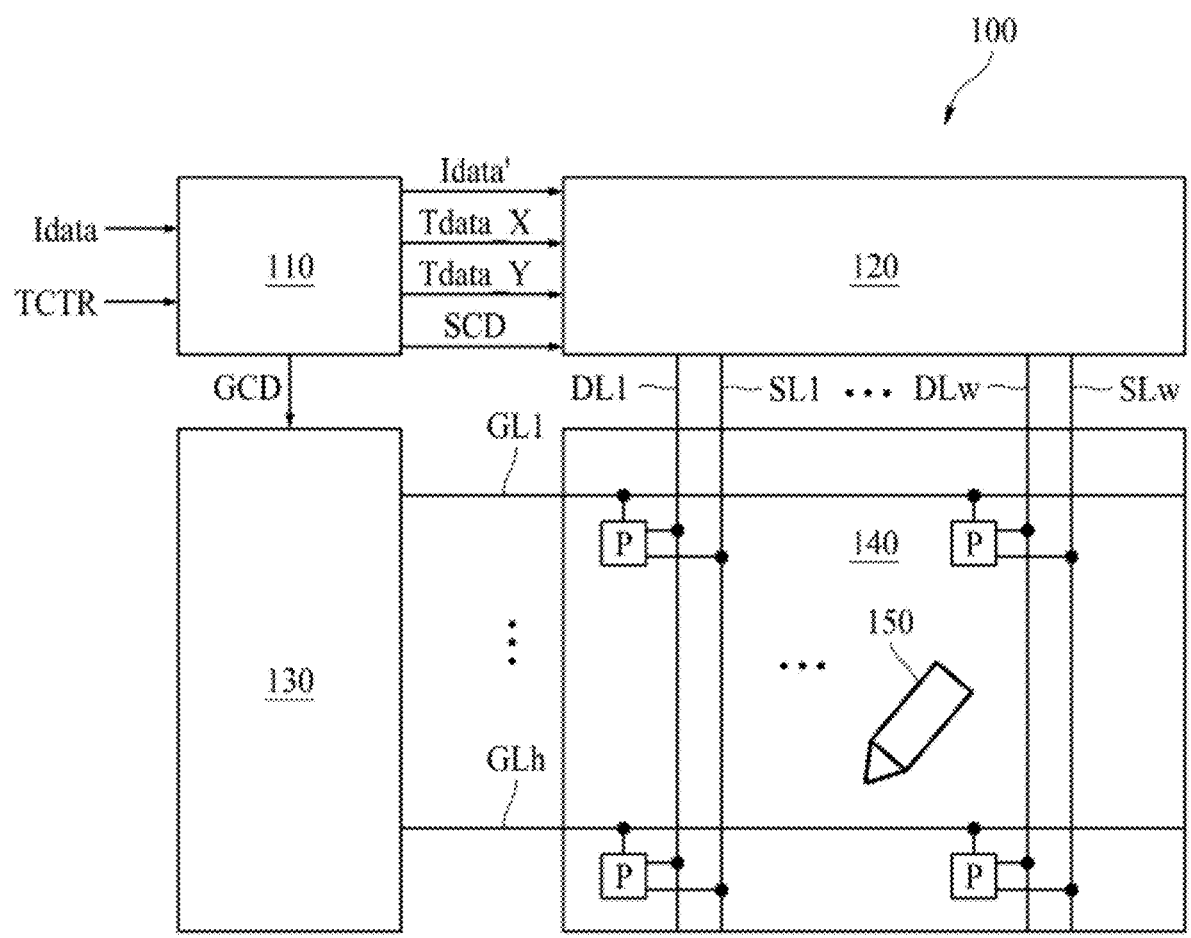
FIG. 1A is a block diagram of a display device including a timing controller according to an embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only-' is used. The terms of a singular form may include plural forms unless referred to the contrary.

In construing an element, the element is construed as including an error range although there is no explicit description.

In describing a time relationship, for example, when the temporal order is described as 'after-', 'subsequent-', 'next-', and 'before-', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Reference will now be made in detail to the exemplary embodiments of the present disclosure with reference to the accompanying drawings.

FIG. 1A is a block diagram of a display device including a timing controller according to an embodiment of the present disclosure. Referring to FIG. 1A, a display device 100 may include a timing controller 110, a source driving circuit 120, a gate driving circuit 130, and a display panel 140.

The display device 100 may be a self-emissive display device including the display panel 140 in which pixels P including self-emission elements are arranged in a matrix form. For example, the display device 100 may be a display device for a television (TV), a display device for navigation, a display device for a computer monitor, or a display device for a mobile terminal.

The timing controller 110 may generate source control data SCD for controlling operations of the source driving circuit 120 and gate control data GCD for controlling operations of the gate driving circuit 130 using timing control data (TCTR) (e.g., the timing control data (TCTR) may include a vertical synchronization signal Vsync, a horizontal synchronization signal Hsync, a dot clock signal DCLK, and a data enable signal DE).

In particular, the timing controller 110 according to the present disclosure may operate the source driving circuit 120 and the gate driving circuit 130 in a normal mode in which an image is displayed using light emitted from a self-emission element and a touch mode in which touch coordinates are acquired using light emitted from the self-emission element.

Figure 1B:
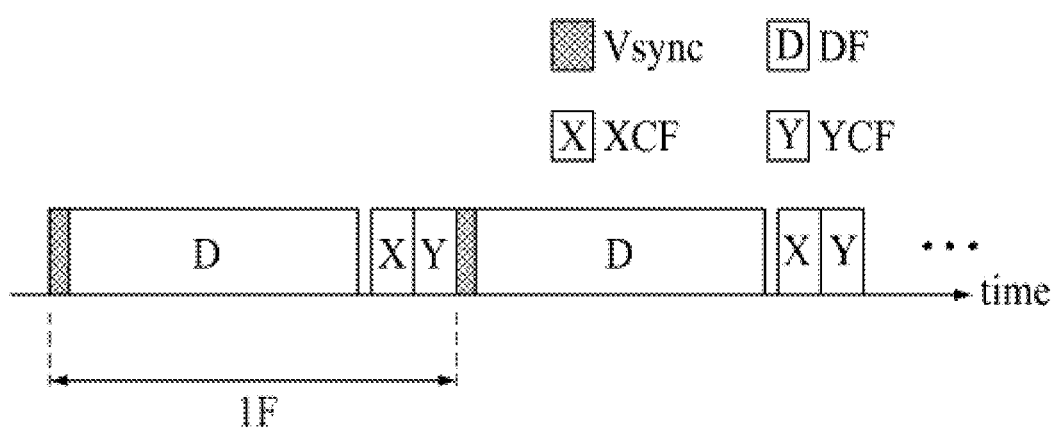
FIG. 1B is a diagram showing arrangement of fields in 1 frame duration according to an embodiment of the present disclosure.

To this end, as shown in FIG. 1B, a 1 frame duration 1F according to the present disclosure may include a display field DF in which the display device 100 is operated in a normal mode, an X coordinate field XCF in which the display device 100 is operated in a touch mode for acquiring X coordinates of touch coordinates, and a Y coordinate field YCF in which the display device 100 is operated in a touch mode for acquiring Y coordinates of touch coordinates.

In this case, the touch coordinates may be acquired while satisfying a general reference (e.g., 120 Hz or 60 Hz) required for displaying an image by arranging the X coordinate field XCF and the Y coordinate field YCF in a rest period in the display field DF or by reducing a time of a vertical blank Vblank section, a Vbackporch section, a Vfrontporch section, or a DE blank section and arranging the X coordinate field XCF and the Y coordinate field YCF therein.

As such, according to the present disclosure, as the display field DF and coordinate fields (the X coordinate field XCF and the Y coordinate field YCF) are separately executed in the 1 frame duration, an image displayed on the display panel 140 during the display field DF may not be affected by an image displayed on the display panel 140 during coordinate fields (the X coordinate field XCF and the Y coordinate field YCF).

Figure 1C:
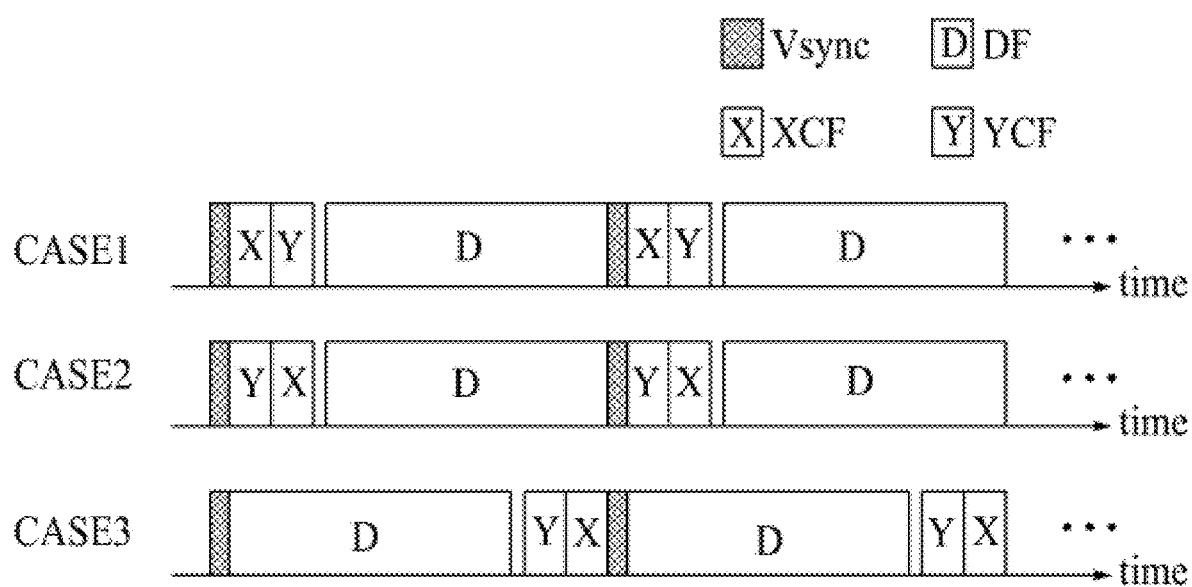
FIG. 1C is a diagram showing arrangement of fields in 1 frame duration according to another embodiment of the present disclosure.

In FIG. 1B, the case in which the display field DF, the X coordinate field XCF, and the Y coordinate field YCF are arranged in the stated order according to the vertical synchronization signal Vsync (e.g., the vertical blank Vblank section) in the 1 frame duration has been described. However, this is merely an example, and as shown in FIG. 1C, according to the vertical synchronization signal Vsync (e.g., the vertical blank Vblank section), the X coordinate field XCF, the Y coordinate field YCF, and the display field DF may be arranged in the stated order (CASE1), the Y coordinate field YCF, the X coordinate field XCF, and the display field DF may be arranged in the stated order (CASE2), or the display field DF, the Y coordinate field YCF, and the X coordinate field XCF may be arranged in the stated order (CASE3).

According to an embodiment, the source control data SCD generated by the timing controller 110 may include a source start pulse SSP for controlling data sampling start timing, a source sampling clock SSC that is a clock signal for controlling sampling timing of data, a first data output enable signal for controlling timing at which a first data voltage for displaying an image through data lines DL1 to DLw is to be output, a second data output enable signal for controlling timing at which a second data voltage for acquiring X coordinates through the data lines DL1 to DLw is to be output, and a third data output enable signal for controlling timing at which a third data voltage for acquiring Y coordinates through the data lines DL1 to DLw is to be output.

In the aforementioned embodiment, the vertical synchronization signal Vsync may be a signal indicating a start timing when one frame begins, the horizontal synchronization signal Hsync may be a signal indicating a start timing when one line begins, the first data output enable signal may be a signal including at least one data pulse indicating a time period in which a first data voltage is input to the data lines DL1 to DLw during the display field DF, the second data output enable signal may be a signal including at least one data pulses indicating a time period in which a second data voltage is input to the data lines DL1 to DLw during the X coordinate field XCF, and the third data output enable signal may be a signal including at least one data pules indicating a time period in which a third data voltage is input to the data lines DL1 to DLw during the Y coordinate field YCF.

The gate control data GCD generated by the timing controller 110 may include a gate start pulse GSP, a gate shift clock GSC, and a gate output enable signal. The gate start pulse GSP may control operation start timing of a plurality of gate driver ICs (not shown) included in the gate driving circuit 130. The gate shift clock GSC may be a clock signal that is commonly input to one or more gate driver ICs and may control shift timing of a gate pulse. The gate output enable signal may specify timing information of one or more gate driver ICs.

In this case, the gate output enable signal may include a first gate output enable signal for selecting gate lines GL1 to GLh connected to pixels that emit light depending on the first data voltage during the display field DF, a second gate output enable signal for selecting the gate lines GL1 to GLh connected to pixels that emit light depending on the second data voltage during the X coordinate field XCF, and a third gate output enable signal for selecting the gate lines GL1 to GLh connected to pixels that emit light depending on the third data voltage during the Y coordinate field YCF.

The first gate output enable signal may be formed in such a way that a gate pulse is applied to each of the gate lines GL1 to GLh to drive the gate lines GL1 to GLh using a row sequential method, the second gate output enable signal may be formed to simultaneously input a gate pulse to all the gate lines GL1 to GLh while the second data voltage is applied through the data lines DL1 to DLw, and the third gate output enable signal may be formed to shift a gate pulse in units of a predetermined number of the gate lines GL1 to GLh and to simultaneously apply the gate pulse to the predetermined number of gate lines GL1 to GLh while the third data voltage is applied to all the data lines DL1 to DLw.

The timing controller 110 may convert image data Idata received from a main chip (not shown) into image data Idata' to be processed by the source driving circuit 120 and may transmit the converted data to the source driving circuit 120. The timing controller 110 may generate X coordinate emission data Tdata_X for acquiring X coordinates and Y coordinate emission data Tdata_Y for acquiring Y coordinates and may transmit the same to the source driving circuit 120.

According to an embodiment, the main chip may be a chip included in any one of a television (TV) system, a navigation system, a set-top box, a DVD player, a blu-ray player, a personal computer (PC), a home theater system, a broadcast receiver, and a phone system.

A display driving circuit may include the source driving circuit 120 and the gate driving circuit 130 and may be operated in a normal mode or a touch mode under control of the timing controller 110.

In detail, the display driving circuit may output a first data voltage corresponding to image data Idata' transmitted from the timing controller 110 through the display panel 140 or detect the characteristics of driving elements included in each pixel P while being driven in a normal mode. The display driving circuit may output a second data voltage and a third data voltage that respectively correspond to the X coordinate emission data Tdata_X and the Y coordinate emission data Tdata_Y for acquiring touch coordinates using a touch of a pen 150 through the display panel 140 while being driven in a touch mode.

That is, the display driving circuit according to the present disclosure may sequentially allow the pixels P to emit light by applying the first data voltage to a corresponding data line according to source control data during the display field DF and driving gate lines according to the gate control data using a row sequential method. The display driving circuit according to the present disclosure may allow the pixels P to emit light in units of i data lines (i being a natural number equal to or greater than 1) using the second data voltage during the X coordinate field XCF and may allow the pixels P to emit light in units of j gate lines (j being a natural number equal to or greater than 1) using the third data voltage during the Y coordinate field YCF, and accordingly, the pen 150 may acquire touch coordinates by detecting light emitted from the pixel P.

Hereinafter, the source driving circuit 120 and the gate driving circuit 130 will be described in more detail.

The source driving circuit 120 may include a plurality of source driver ICs (not shown), may be driven in a normal mode during the display field DF under control of the timing controller 110, and may be driven in a touch mode during the X coordinate field XCF and the Y coordinate field YCF.

In detail, the source driving circuit 120 may be operated in a normal mode during the display field DF to convert the image data Idata' into the first data voltage according to the source control data SCD transmitted from the timing controller 110 and to supply the converted first data voltages to the pixels P through the data lines DL1 to DLw. In particular, the source driving circuit 120 may output the first data voltage to a corresponding data line during a period in which data pulses included in the first data output enable signal are in a high level.

The source driving circuit 120 may be operated in a normal mode during the display field DF, may generate data voltages for sensing using the source control data SCD in order to sense the characteristics of a driving element (e.g., a driving transistor (TFT)) included in each pixel P, and may supply the data voltages for sensing to the pixels P through the data lines DL1 to DLw. According to an embodiment, the characteristics of a driving element may include at least one of a threshold voltage or mobility of the driving element.

The source driving circuit 120 may be operated in a touch mode during the X coordinate field XCF to convert the X coordinate emission data Tdata_X transmitted from the timing controller 110 into the second data voltage. The source driving circuit 120 may output the second data voltage to a predetermined number of data lines (for example, i data lines) while sequentially shifting the data lines DL1 to DLw in unit of i data lines according to the source control data SCD transmitted from the timing controller 110. In particular, the source driving circuit 120 may output the second data voltage to corresponding data lines during a period in which data pulses included in the second data output enable signal are in a high level.

According to an embodiment, a second data voltage may be set to different values (e.g., different grayscale values or different colors) for respective lines to which the second data voltage is to be output. For example, a value of a second data voltage applied to a data line #1 and a value of the second data voltage applied to a data line #2 may be different from each other.

In this case, i may be set to 1 or a value equal to or greater than 2. That is, when i is set to 1, the source driving circuit 120 may allow pixels connected to one data line to simultaneously emit light in units of 1 data line, and when i is set to a value equal to or greater than 2, the source driving circuit 120 may set two or more data lines to one data line group and allow pixels connected to a corresponding data line group to simultaneously emit light in units of a data line group.

According to an embodiment, when i is set to a value equal to or greater than 2, the value of i may be determined depending on at least one of a predetermined X coordinate precision value or an X-direction resolution value of the display panel 140.

The source driving circuit 120 may be operated in a touch mode during the Y coordinate field YCF to convert the Y coordinate emission data Tdata_Y transmitted from the timing controller 110 into a third data voltage and to simultaneously output the third data voltage through all of the data lines DL1 to DLw according to the source control data SCD transmitted from the timing controller 110. In this case, a value (e.g., a grayscale value or color) of the third data voltage may be differently set for each gate line selected to output the third data voltage. For example, a value of a third data voltage applied to all of the data lines DL1 to DLw when a gate line #1 is selected and a value of the third data voltage applied to all of the data lines DL1 to DLw when a gate line #2 is selected may be from each other.

According to the aforementioned embodiment, the source driving circuit 120 may output the third data voltage to all data lines during a period in which a data pulse included in the third data output enable signal is in a high level.

The gate driving circuit 130 may be operated in a normal mode during the display field DF and may sequentially supply gate pulses to the gate lines GL1 to GLh to operate gate lines for displaying an image according to the gate control data GCD transmitted from the timing controller 110 using a row sequential method. The gate driving circuit 130 may generate gate pulses for sensing using the gate control data GCD in order to sense the characteristics of a driving element included in each pixel P during the display field DF and may sequentially supply the gate pulses for sensing to the gate lines GL1 to GLh using a row sequential method.

The gate driving circuit 130 may be operated in a touch mode during the X coordinate field XCF and may simultaneously supply gate pulses through all gate lines according to the gate control data GCD transmitted from the timing controller 110 to sequentially turn on the pixels P in units of i data lines. In this case, the gate pulses may be simultaneously supplied to the gate lines GL1 to GLh according to the second gate output enable signal.

The gate driving circuit 130 may be operated in the touch mode during the Y coordinate field YCF and may supply gate pulses in units of j gate lines according to the gate control data GCD transmitted from the timing controller 110 to sequentially turn on the pixels P in units of j gate lines. In this case, the gate pulses may be supplied in units of j gate lines according to the third gate output enable signal.

In this case, j may be set to 1 or a value equal to or greater than 2. That is, when j is set to 1, the gate driving circuit 130 may allow pixels connected to all of the data lines DL1 to DLw to simultaneously emit light in units of 1 gate line, and when j is set to 2, the gate driving circuit 130 may set two or more gate lines to one gate line group and allow pixels connected to a corresponding gate line group to simultaneously emit light in units of a gate line group.

According to an embodiment, when j is set to a value equal to or greater than 2, the value of j may be determined depending on at least one of a predetermined Y coordinate precision value or a Y-direction resolution value of the display panel 140.

The display panel 140 may include the pixels P arranged in a matrix form of w×h, and each pixel P may be connected to a corresponding data line among the data lines DL1 to DLw, a corresponding sensing line among sensing lines SL1 to SLw, and a corresponding gate line among the gate lines GL1 to GLh.

Each pixel P may display an image corresponding to the image data Idata' on the display panel 140 according to the respective gate pulses input through the gate lines GL1 to GLh and the first data voltage input through each of the data lines DL1 to DLw during the display field DF. Each pixel P may transmit a sensing signal to the source driving circuit 120 through each of the sensing lines SL1 to SLw. The sensing signal is obtained by sensing the characteristics of a driving element included in a corresponding pixel P according to the data voltage for sensing input through the data lines DL1 to DLw during the display field DF. According to an embodiment, each pixel P may include an organic light-emitting diode (OLED) as a self-emission element.

Each of the pixels P may sequentially emit light while being shifted in units of i data lines according to gate pulses that are simultaneously input through all of the gate lines GL1 to GLh and the second data voltage input through the data lines DL1 to DLw connected to a corresponding pixel P during the X coordinate field XCF.

For example, during the X coordinate field XCF, the gate driving circuit 130 may simultaneously supply gate pulses to all of the gate lines GL1 to GLh arranged on the display panel 140 according to the second gate output enable signal output from the timing controller 110, and the source driving circuit 120 may supply second data voltages while shifting i data lines among the data lines DL1 to DLw arranged on the display panel 140 according to the second data output enable signal output from the timing controller 110, and thus pixels connected to corresponding data lines may emit light.

In this case, when second data voltages having different color or different grayscale values are set for respective data lines to which the second data voltage is to be output, pixels connected to corresponding data lines may emit light with different color or different grayscale values for respective data lines.

Each of the pixels P may sequentially emit light while being shifted in units of j gate lines according to a gate pulse input in units of j gate lines and third data voltages that are simultaneously input through all of the data lines DL1 to DLw during the Y coordinate field YCF.

For example, during the Y coordinate field YCF, the source driving circuit 120 may simultaneously supply third data voltages to all of the data lines DL1 to DLw arranged on the display panel 140 according to the third data output enable signal output from the timing controller 110, and the gate driving circuit 130 may supply gate pulses while shifting j gate lines among the gate lines GL1 to GLh arranged on the display panel 140 according to the third gate output enable signal output from the timing controller 110, and accordingly, pixels connected to corresponding gate lines emit light.

In this case, when third data voltages having different color or different grayscale values are set for respective gate lines selected for outputting the third data voltage, pixels connected to corresponding gate lines may emit light with different color or different grayscale values for respective gate lines.

The pen 150 may obtain touch coordinates of a pixel touched by the pen 150 by detecting an emissive state of at least one pixel corresponding to the current position of the pen 150 via contact (or non-contact) with the display panel 140. According to an embodiment, the touch coordinates may be defined by X coordinates and Y coordinates of a pixel in which emission is detected. The pen 150 may transmit the obtained touch coordinates to the main chip (not shown). According to an embodiment, the pen 150 may wirelessly transmit the touch coordinates to a host system.

Hereinafter, with reference to FIG. 2, a method of determining touch coordinates by the pen 150 will be described in detail. FIG. 2 is a diagram for explaining a method of determining coordinates by a pen.

Figure 2A:
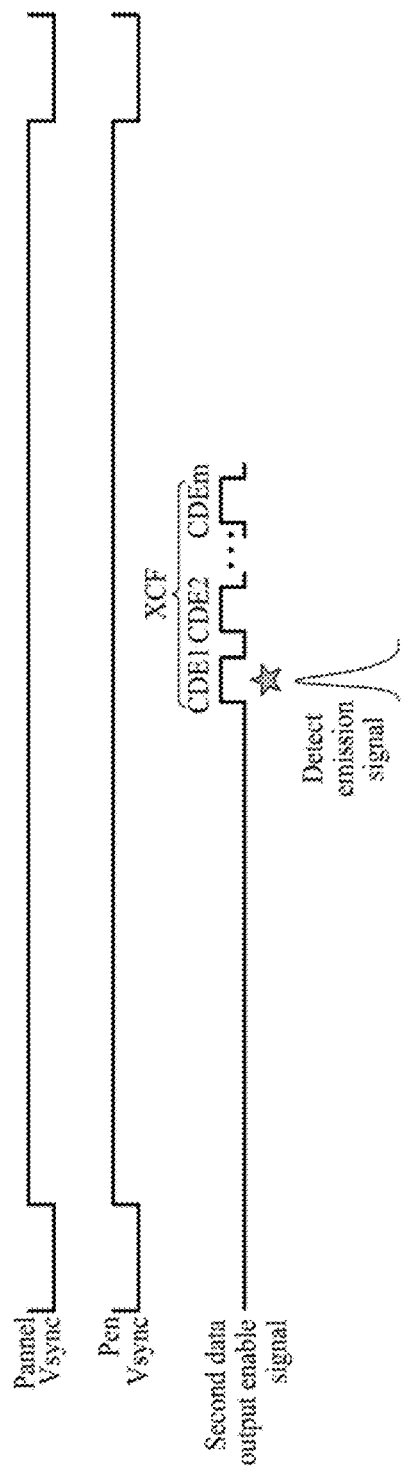
FIGS. 2A and 2B are diagrams for explaining a method of determining coordinates by a pen.

FIG. 2A is a diagram showing the case in which one emission signal is detected in an X coordinate field (or a Y coordinate field). The pen 150 may determine a number of one data pulse among data pulses (CDE1~CDEm) included in a second data enable signal as X coordinates. The one data pulse is corresponding to a time difference between a level transition timing (e.g., a rising edge timing) of a vertical synchronization signal Pen Vsync of the pen 150 and a detection time at which emission is detected in the X coordinate field XCF. In FIG. 2A, the one data pulse is a first data pulse CDE1 among the data pulses. At this time, the vertical synchronization signal Pen Vsync of the pen 150 is synchronized with a vertical synchronization signal Panel Vsync of the display panel 140.

In this case, the pen 150 may acquire information on a difference between the rising edge timing of the vertical synchronization signal and the timing at which an initial data pulse among data pulses included in the second data output enable signal is generated (or a difference between the rising edge timing of the vertical synchronization signal and the timing at which an X coordinate field is started) and information on a duration time of one data pulse from the display panel 140 during an initial synchronization procedure with the display panel 140. Accordingly, the pen 150 may determine an ordinal number of a data pulse, corresponding to the timing at which emission is detected, among data pulses included in the second data output enable signal (or the third data output enable signal) using a time difference between the vertical synchronization signal and the timing at which emission is detected, and may determine an ordinal number of the data pulse in which emission is detected, as X coordinates.

Similarly, in the case of Y coordinates, the pen 150 may determine an ordinal number of a data pulse included in the third data output enable signal, corresponding to a time difference between the level transition timing (e.g., a rising edge timing) of the vertical synchronization signal of the pen 150 and a detection timing at which emission is detected in the Y coordinate field YCF, as Y coordinates.

Figure 2B:
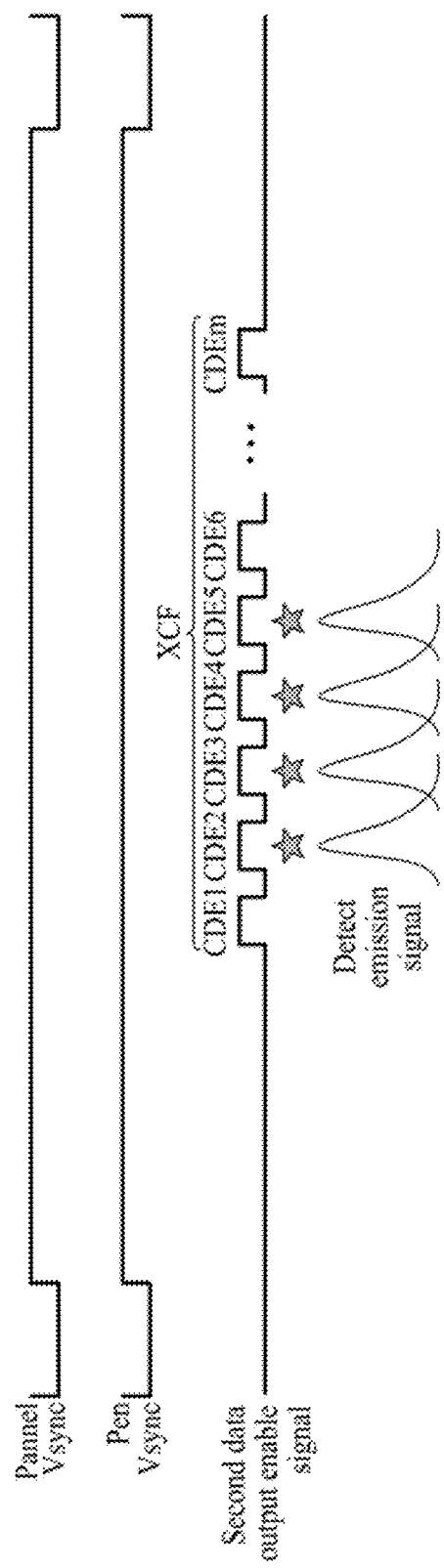

As shown in FIG. 2B, when a plurality of emission signals is detected in the X coordinate field (or the Y coordinate field), the pen 150 may calculate ordinal numbers of data pulses corresponding to the respective detection timings at which emission is detected or may determine any one of data pulses, corresponding to the respective detection timings at which emission is detected, as X coordinates (or Y coordinates). In this case, a method of determining an ordinal number of a data pulse corresponding to each detection timing is the same as that of FIG. 2A, and thus a detailed description thereof will be omitted.

According to a first embodiment, the pen 150 may determine an ordinal number of a data pulse CDE2, corresponding to the timing at which the emission signal is detected earliest in time, among data pulses CDE2 to CDE5 corresponding to the respective detection timings at which the emission signal is detected, as X coordinates (or Y coordinates).

According to a second embodiment, the pen 150 may determine an average (e.g., 3.5) of ordinal numbers of the data pulses CDE2 to CDE5 corresponding to the respective detection timings at which the emission signal is detected, as X coordinates.

According to a third embodiment, the pen 150 may determine an ordinal number of a data pulse CDE5 corresponding to the timing at which the emission is detected last in time, among the data pulses CDE2 to CDE5 corresponding to the respective detection timings at which the emission signal is detected, as X coordinates (or Y coordinates).

As described above, the display device 100 according to the present disclosure may acquire touch coordinates by allowing a self-emission element included in each pixel P to emit light for acquiring the touch coordinates and receiving light emitted from the self-emission element through the pen 150 without a separate touch IC or a separate touch screen panel for detecting a touch using the pen 150.

Figure 3:
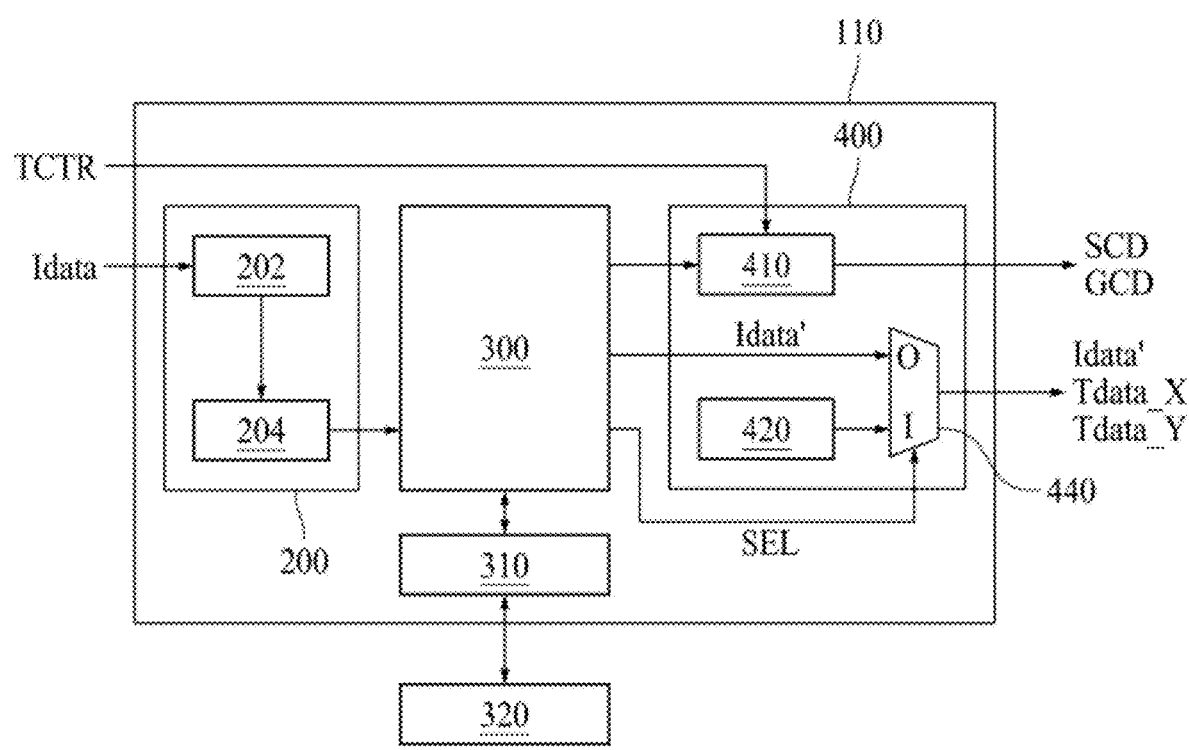
FIG. 3 is a block diagram of the timing controller shown in FIG. 1.

Hereinafter, the configuration of a timing controller according to the present disclosure will be described in detail with reference to FIG. 3. FIG. 3 is a block diagram of the timing controller shown in FIG. 1. Referring to FIG. 3, the timing controller 110 may include an image receiving circuit 200, a display image quality and compensation processing circuit 300, a bridge IC 310, and a control circuit 400.

The image receiving circuit 200 may receive an image source from the outside and may include a fetch unit 202 and a converter 204 as shown in FIG. 3.

The fetch unit 202 may perform pre fetch on image data from an image source input from the outside, for example, the digital video data Idata.

The converter 204 may convert the image data Idata acquired by the fetch unit 202 into system data to be used in the timing controller 110 and may transmit the converted system data to the display image quality and compensation processing circuit 300.

The display image quality and compensation processing circuit 300 may write the system data (or image data) in a memory 320 through the bridge IC 310 or may read the system data (or image data) stored in the memory 320.

The display image quality and compensation processing circuit 300 may compensate for the system data received from the image receiving circuit 200 or the bridge IC 310 using a predetermined compensation algorithm or may convert the system data into the form to be processed by the source driving circuit 120 to generate the image data Idata'. The display image quality and compensation processing circuit 300 may output the generated image data Idata' to the control circuit 400.

The bridge IC 310 may convert format of the system data into format appropriate for the memory 320 and may store the converted system data in the memory 320 or may read the system data stored in the memory 320 and may provide the system data to the display image quality and compensation processing circuit 300. The bridge IC 310 may adjust the timing at which data stored in the memory 320 is read. According to an embodiment, the memory 320 may include a volatile memory and a non-volatile memory.

The bridge IC 310 according to the present disclosure may read resolution information of the display panel 140 for acquiring touch coordinates, an X coordinate precision value, and a Y coordinate precision value from the memory 320 and may transmit the read information to the control circuit 400 through the display image quality and compensation processing circuit 300.

The control circuit 400 may generate control data and may output the generated control data together with the image data Idata', the X coordinate emission data Tdata_X, or the Y coordinate emission data Tdata_Y, received from the display image quality and compensation processing circuit 300.

To this end, the control circuit 400 may include a control data generation circuit 410, a coordinate data generation circuit 420, and a selection circuit 440. The selection circuit 440 may be embodied as a multiplexer.

The control data generation circuit 410 may generate control data for controlling an operation of the source driving circuit 120 and the gate driving circuit 130 based on timing control data (TCTR) received from the outside. In detail, the control data generation circuit 410 may generate the source control data SCD for controlling an operation of the source driving circuit 120 and the gate control data GCD for controlling an operation of the gate driving circuit 130.

In this case, the source control data SCD generated by the control data generation circuit 410 according to the present disclosure may include the first data output enable signal for outputting the image data Idata', the second data output enable signal for outputting the X coordinate emission data Tdata_X, and the third data output enable signal for outputting the Y coordinate emission data Tdata_Y.

The gate control data GCD generated by the control data generation circuit 410 according to the present disclosure may include the first gate output enable signal for outputting the image data Idata', the second gate output enable signal for outputting the X coordinate emission data Tdata_X, and the third gate output enable signal for outputting the Y coordinate emission data Tdata_Y.

Figure 4:
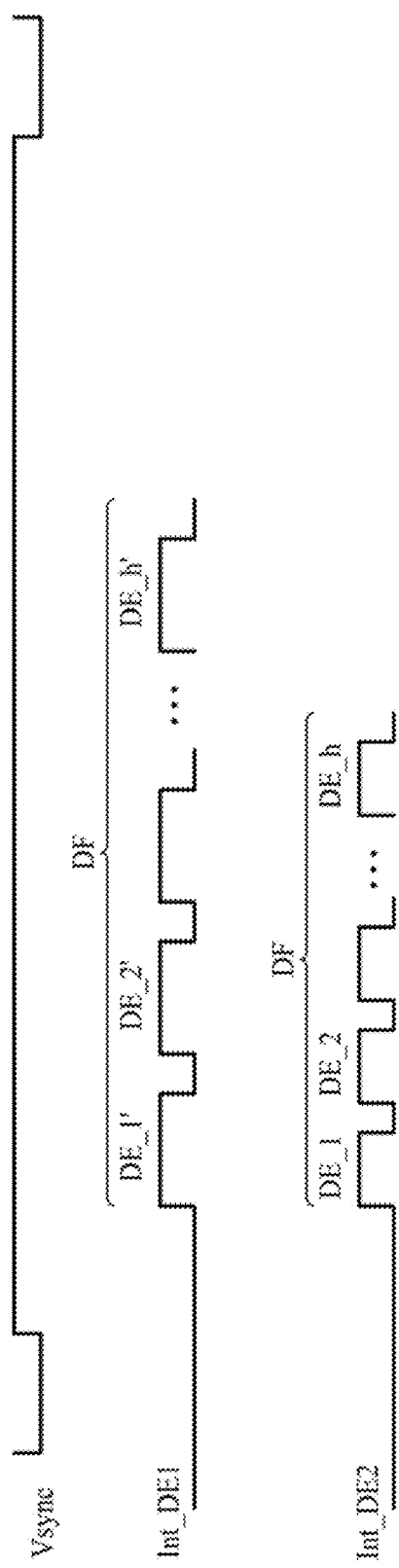
FIG. 4 is a diagram showing an example of a method of generating a first data output enable signal by the control data generation circuit shown in FIG. 3.

FIG. 4 is a diagram showing an example of a method of generating a first data output enable signal by the control data generation circuit shown in FIG. 3. As seen from FIGS. 3 to 4, the control data generation circuit 410 may generate a first data output enable signal Int_DE2 by adjusting a period of a data enable signal Int_DE1 input from the outside to be short (or small) during the display field DF.

According to the embodiment, when the display panel 140 has a resolution of w×h, the control data generation circuit 410 may generate the first data output enable signal Int_DE2 having h data pulses DE_1 to DE_h by adjusting a period of each of h data pulses DE_1' to DE_h' included in the data enable signal Int_DE1 to be short during the display field DF.

As such, the X coordinate field XCF and the Y coordinate field YCF may be additionally designated in the 1 frame duration while a general reference (e.g., 120 Hz or 60 Hz) is satisfied by adjusting a period of each of data pulses DE_1 to DE_h included in the first data output enable signal Int_DE2 for displaying an actual image to be short.

The control data generation circuit 410 may also additionally generate control data for controlling a gamma control signal or a power management IC (PMIC).

According to an embodiment, the control data generation circuit 410 may generate the source control data SCD and the gate control data GCD by applying resolution information, an X coordinate precision value, and a Y coordinate precision value of the display panel 140, which are received through the display image quality and compensation processing circuit 300.

In detail, the control data generation circuit 410 may set the X coordinate precision value to the number (i) of the data lines DL1 to DLw to which the second data voltage is simultaneously applied during the X coordinate field XCF, and may calculate the number (m) of data pluses to be included in the second data output enable signal based on the X-direction resolution value and the X coordinate precision value of the display panel 140.

According to an embodiment, the number (m) of data pluses to be included in the second data output enable signal may be calculated using Equation 1 below.

$$m = w/Xcp \qquad \text{[Equation 1]}$$

In Equation 1, w indicates an X-direction resolution value of the display panel 140, and Xcp indicates an X coordinate precision value.

According to the embodiment, the control data generation circuit 410 may generate the second data output enable signal to correspond to each of m data pulses X_DE1 to X_DEm included in the second data output enable signal in units of i data lines. In this case, the control data generation circuit 410 may generate the second gate output enable signal to simultaneously supply a gate pulse to all of the gate lines GL1 to GLh.

The control data generation circuit 410 may set the Y coordinate precision value to the number (j) of the gate lines GL1 to GLh to which the third data voltage is simultaneously applied during the Y coordinate field YCF, and may calculate the number (n) of data pulses to be included in the third data output enable signal in order to apply the third data voltage in units of j gate lines during the Y coordinate field YCF according to the resolution and the Y coordinate precision value of the display panel 140.

According to an embodiment, the number (n) of data pulses to be included in the third data output enable signal may be calculated using Equation 2 below.

$$n = h/Ycp \qquad \text{[Equation 2]}$$

Here, h indicates a Y-direction resolution value of the display panel 140, and Ycp indicates a Y coordinate precision value.

According to the embodiment, the control data generation circuit 410 may generate the third gate output enable signal to sequentially supply gate pulses in units of j gate lines, and may generate the third data output enable signal including n data pulses Y_DE1 to Y_DEn for simultaneously applying the third data voltage to all of the data lines DL1 to DLw in units of j gate lines.

The coordinate data generation circuit 420 may generate the X coordinate emission data Tdata_X for acquiring X coordinates and the Y coordinate emission data Tdata_Y for acquiring Y coordinates. According to an embodiment, since the X coordinate emission data Tdata_X and Y coordinate emission data Tdata_Y are not for image display but for touch coordinates acquisition, when emitting, emission may not be perceived by the user's eye. Accordingly, the X coordinate emission data Tdata_X and Y coordinate emission data Tdata_Y may be generated to have a low grayscale value.

The coordinate data generation circuit 420 may generate emission data to allow all pixels to emit light with the same color. However, according to another embodiment, the coordinate data generation circuit 420 may generate the X coordinate emission data Tdata_X and the Y coordinate emission data Tdata_Y to allow each pixel to emit light with random color. According to the present disclosure, the X coordinate emission data Tdata_X and the Y coordinate emission data Tdata_Y are generated to allow each pixel to emit light with random color because the X coordinate emission data Tdata_X and the Y coordinate emission data Tdata_Y are generated at a final output end without being image-quality processed and compensation-processed, and as a ghost image is occurred by pixels emitting light in order to acquire touch coordinates or the display panel 140 is degraded due to continuous emission with same color.

Accordingly, the coordinate data generation circuit 420 according to the present disclosure may allow all pixels to emit light with random color, may randomly vary color of emission data in units of frames and in units of i data lines to which the second data voltage is simultaneously applied, or may vary color of emission data in units of frames and in units of j gate lines to which gate pulses are simultaneously applied.

Figure 5A:
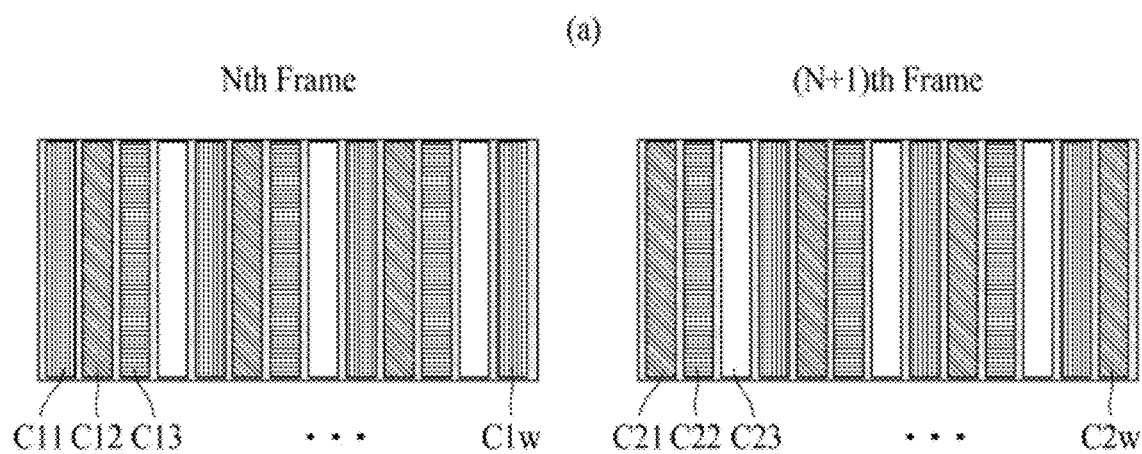
FIGS. 5A and 5B is a diagram showing an example of a method of arbitrarily setting color of emission data.
Figure 5B:
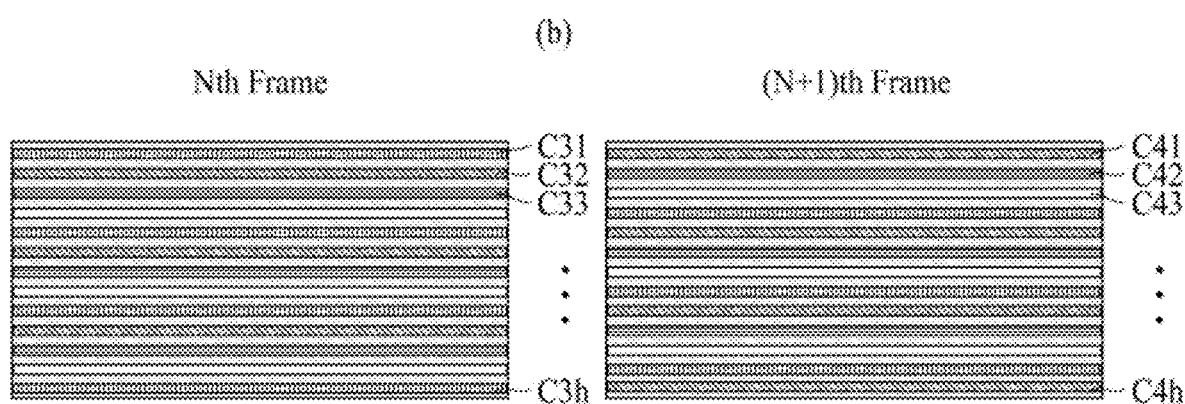

FIG. 5 is a diagram showing an example of a method of randomly setting color of emission data. As shown in (a) of FIG. 5, regions C11 to C1w which emits light to acquire X coordinates in an Nth frame and regions C21 to C2w emit light to acquire X coordinates in an (N+1)th frame may be the same region, respectively and each of the regions C11 to C1w and C21 to C2w may include one data line or may include i (i being a natural number equal to or greater than 2) data lines.

In the example shown in (a) of FIG. 5, pixels of each of the regions C11 to C1w which emit light to acquire X coordinates may emit light with random color, pixels of each of the regions C21 to C2w which emit light to acquire X coordinates may emit light with random color, and pixels included in regions C11 and C21, C12 and C22, C13 and C23, C14 and C24, and C1w and C2w, which correspond to each other in an Nth frame and an (N+1)th frame, may also emit light with different colors.

That is, the coordinate data generation circuit 420 may generate emission data in such a way that a region C11 including pixels connected to one or i data lines corresponding to a first data pulse X_DE1 among m data pulses X_DE1 to X_DEm included in the second data output enable signal in the Nth frame has first color. The coordinate data generation circuit 420 may generate emission data in such a way that a region C12 including pixels connected to one or i data lines corresponding to a second data pulse X_DE2 has second color.

In addition, the coordinate data generation circuit 420 may generate emission data in such a way that a region C11 including pixels connected to one or i data lines corresponding to the first data pulse X_DE1 among m data pulses X_DE1 to X_DEm included in the second data output enable signal in the Nth frame has first color. The coordinate data generation circuit 420 may generate emission data in such a way that a region C21 including pixels connected to one or i data lines corresponding to the first data pulse X_DE1 in the (N+1) frame has third color.

Similarly, as shown in (b) of FIG. 5, regions C31 to C3h which emits light to acquire Y coordinates in the Nth frame and regions C41 to C4h which emits light to acquire Y coordinates in the (N+1)th frame may be the same region, respectively and each of the regions C31 to C3h and C41 to C4h may include one gate line or may include j (j being a natural number equal to or greater than 2) gate lines.

In the example shown in (b) of FIG. 5, pixels of each of the regions C31 to C3h which emit light to acquire Y coordinates may emit light with random color, pixels of each of the regions C41 to C4h which emit light to acquire Y coordinates may emit light with random color, and pixels included in regions C31 and C41, C32 and C42, and C3h and C4h, which correspond to each other in the Nth frame and the (N+1)th frame may also emit light with different colors. Thereby, a ghost image may not be occurred on the display panel 140 with respect to pixels that emit light to acquire touch coordinates.

That is, the coordinate data generation circuit 420 may generate emission data in such a way that a region C31 including pixels connected to one or j gate lines to which a third data voltage is simultaneously applied according to a first data pulse Y_DE1 among n data pulses Y_DE1 to Y_DEn included in the third data output enable signal in the Nth frame has fourth color. The coordinate data generation circuit 420 may generate emission data in such a way that a region C32 including pixels connected to one or j gate lines to which the third data voltage is simultaneously applied according to a second data pulse Y_DE2 has fifth color.

In addition, the coordinate data generation circuit 420 may generate emission data in such a way that the region C31 including pixels connected to one or j gate lines to which the third data voltage is simultaneously applied according to the first data pulse Y_DE1 among the n data pulses Y_DE1 to Y_DEn included in the third data output enable signal in the Nth frame has fourth color. The coordinate data generation circuit 420 may generate emission data in such a way that a region C41 including pixels connected to one or j gate lines to which the third data voltage is simultaneously applied according to the first data pulse Y_DE1 among the n data pulses Y_DE1 to Y_DEn included in the third data output enable signal in the (N+1)th frame has sixth color.

The coordinate data generation circuit 420 may output the generated X coordinate emission data Tdata_X and Y coordinate emission data Tdata_Y to the selection circuit 440.

The selection circuit 440 may selectively output the image data Idata' from the display image quality and compensation processing circuit 300, or the X coordinate emission data Tdata_X and the Y coordinate emission data Tdata_Y that are generated by the coordinate data generation circuit 420 based on a selection signal SEL output from the display image quality and compensation processing circuit 300.

For example, the selection circuit 440 may output the image data Idata' in response to the selection signal SEL having a first level and the selection circuit 440 may output the X coordinate emission data Tdata_X or the Y coordinate emission data Tdata_Y in response to the selection signal SEL having a second level.

The timing controller 110 according to the present disclosure may set coordinate precision depending on the size of a pixel included in the display panel 140 and may store the set coordinate precision in the memory 320.

Figure 6:
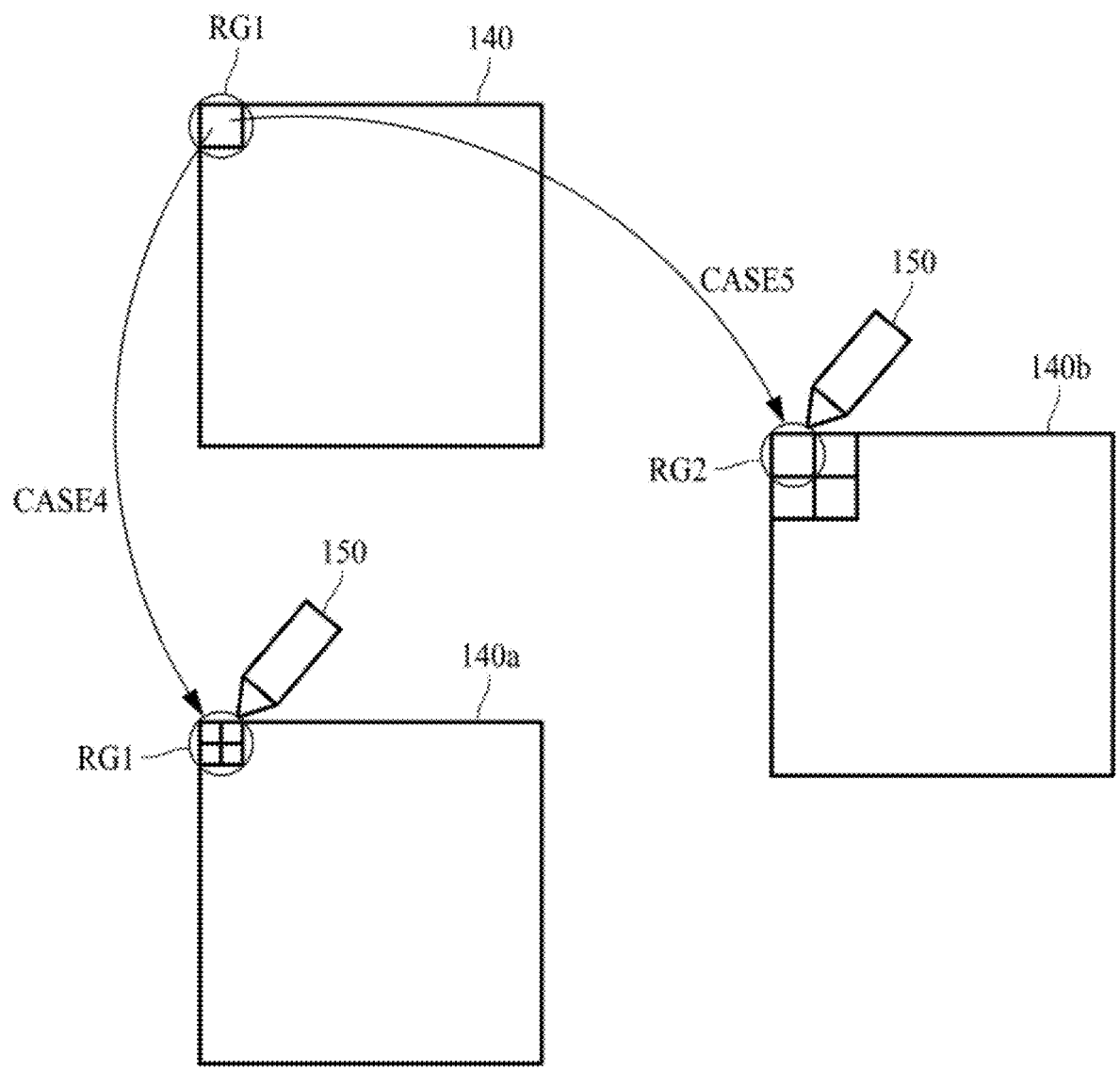
FIG. 6 is a diagram for explaining options of coordinate precision.

FIG. 6 is a diagram showing an example of a method of setting coordinate precision by the timing controller 110. Referring to FIG. 6, when the display device 100 has a medium size (e.g., 50 inches), the pen 150 may calculate (or acquire) touch coordinates in units of regions RG1 including four pixels (CASE4), and when the display device 100 has a large size (e.g., 88 inches), the pen 150 may calculate (or acquire) touch coordinates in units of regions RG2 including one pixel (CASE5). Accordingly, when the display device 100 has a medium size, X and Y coordinate precision values may be set to 4, and when the display device 100 has a large size, the X and Y coordinate precision values may be set to 1.

For example, assuming that the display panel 140 has 1920×1080 pixels (or resolution of 1920×1080), an X coordinate precision value (X coordinate precision value) is 8 (or 8 pixels), and a Y coordinate precision value has 4 (or 4 lines), the timing controller 110 may generate a first data output enable signal having 1080 data pulses DE_1 to DE_1080 in the display field DF, may generate a second data output enable signal having 240(=1920/8) data pulses X_DE1 to X_DE240 in the X coordinate field XCF, and may generate a third data output enable signal having 270(=1080/4) data pulses Y_DE1 to Y-DE270 in the Y coordinate field YCF.

According to the embodiment, the display panel 140 may allow all pixels connected to 9th to 16th data lines to emit light based on resolution of w (e.g., 1920) in the X coordinate field XCF according to the second data pulse X_DE2 of the second data output enable signal. Similarly, the display panel 140 may allow all pixels connected to fifth to eighth gate lines to emit light based on resolution of h (e.g., 1080) according to the second data pulse Y_DE2 of the third data output enable signal in the Y coordinate field.

In this case, the pen 150 may acquire an emission signal at the timing at which the second data pulse X_DE2 of the second data output enable signal is output and may acquire an emission signal at the timing at which the second data pulse Y_DE2 of the third data output enable signal is output, X coordinates may be recognized as 2, and Y coordinates may be recognized as 2.

According to an embodiment, when the timing controller 110 is connected to a new display panel, resolution of the newly connected display panel may be determined, and the second and third data output enable signals may be newly generated according to the determination result.

Figure 7:
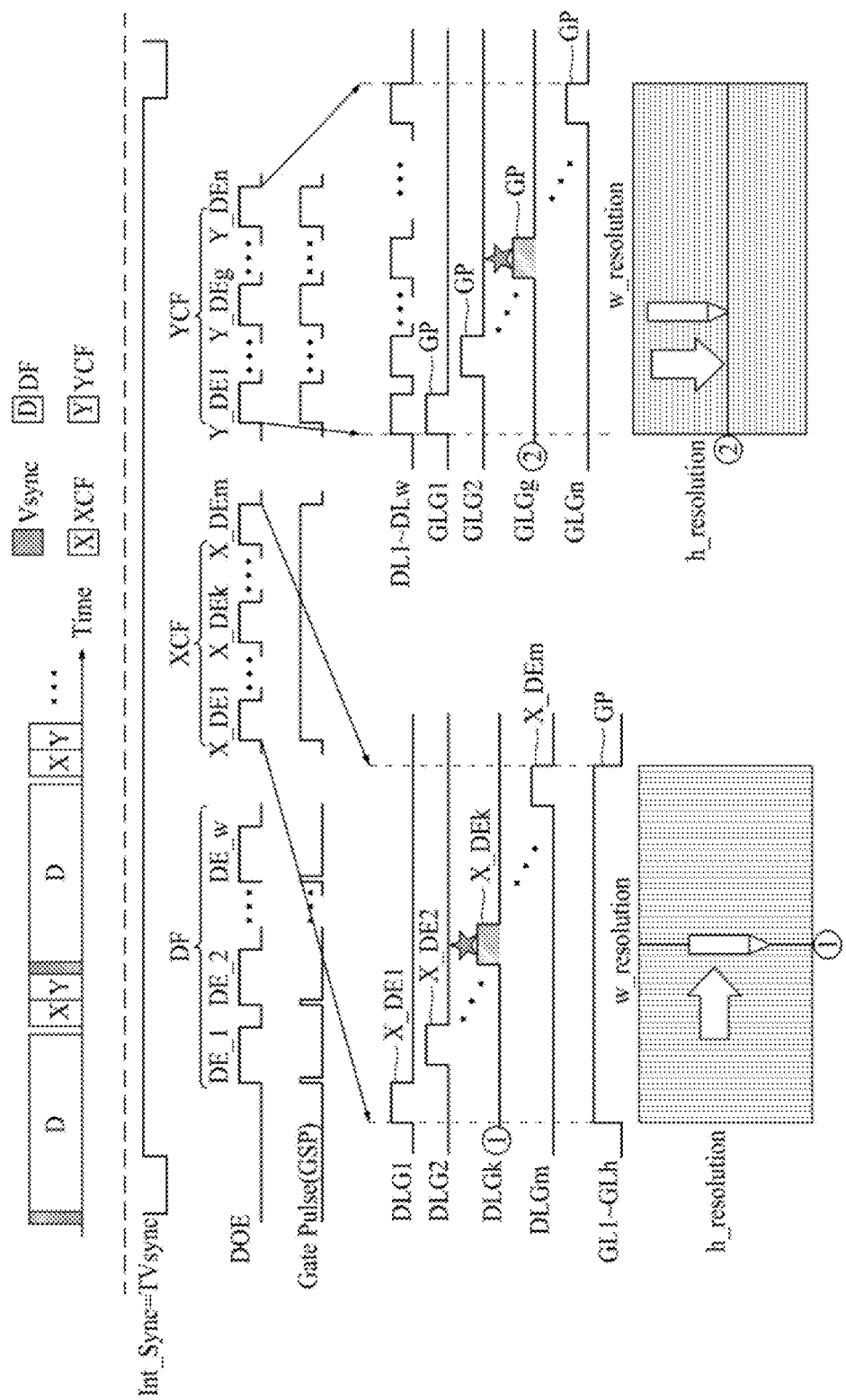
FIG. 7 is a diagram showing an example of a method of operating a timing controller according to another embodiment of the present disclosure.

FIG. 7 is a conceptual diagram for explaining an operation of the timing controller shown in FIG. 3.

For convenience of description, FIG. 7 illustrates the case in which a first frame includes a vertical synchronization signal Vsync, the display field DF for outputting image data, the X coordinate field XCF for outputting X coordinate emission data for acquiring X coordinates, and the Y coordinate field YCF for outputting Y coordinate emission data to acquire Y coordinates in the state order.

During the X coordinate field XCF, the coordinate data generation circuit 420 may generate the X coordinate emission data Tdata_X, and the control data generation circuit 410 may output the second data output enable signal including m data pulses X_DE1 to X_DEm and the second gate output enable signal for simultaneously applying the gate pulse GP through all gate lines.

The gate driving circuit 130 may simultaneously output the gate pulse GP to the h gate lines GLl1 to GLh in response to the second gate output enable signal. Accordingly, the pixels P connected to the gate lines GL1 to GLh may be connected to the data lines DL1 to DLw, respectively, in response to the simultaneously applied gate pulse GP.

The source driving circuit 120 may convert the X coordinate emission data Tdata_X into the second data voltage, and may output the second data voltage in units of i data lines in synchronization with the m data pulses X_DE1 to XDEm according to the second data output enable signal. Accordingly, OLED of a pixel connected to each data line may emit light in units of i data lines.

Hereinafter, an example of an operation of a timing controller according to the present disclosure will be described in more detail.

As a first example, assuming that a display panel has 1920×1080 pixels (or resolution of 1920×1080), an X coordinate precision value has 8 (or 8 pixels), and a Y coordinate precision value is 4 (or 4 lines), in the display field DF, the first data output enable signal having 1920 data pulses DE_1 to DE_1920 and the first gate output enable signal for allowing 1080 gate lines to output gate pulses using a row sequential method may be generated. In this case, when each of data pulses included in the first data output enable signal is in a high level, the first data voltage may be applied in units of 1 data line.

In the X coordinate field XCF, m is set to 240, and thus the second data output enable signal having 240 data pulses X_DE1 to X_DE240 and the second gate output enable signal for allowing 1080 gate lines to simultaneously output the gate pulses GP may be generated. In this case, the X coordinate precision value is 8, and thus when each of data pulses included in the second data output enable signal is in a high level, the second data voltage may be applied in units of 8 data lines.

For example, while the first data pulse X_DE1 included in the second data output enable signal is maintained in a high level, the gate pulse GP may be applied to all gate lines GL1 to GL1080 and the second data voltage is output to the first to eighth data lines DL1 to DL8 corresponding to a first data line group DLG1, and thus all pixels connected to the first data line group DLG1 may emit light.

Continuously, while the second data pulse X_DE2 is maintained in a high level, the gate pulse GP may be applied to all of the gate lines GL1 to GL1080 and the second data voltage may be output to ninth to sixteenth data lines DL9 to DL16 corresponding to a second data line group DLG2, and accordingly, all pixels connected to the second data line group DLG2 emit light.

Lastly, while a 240th data pulse X_DE240 are maintained in a high level, the gate pulse GP may be applied to all of the gate lines GL1 to GL1080 and the second data voltage may be output to 1913th to 1920th data lines DL1913 to DL1920 corresponding to a 240th data line group DLG240, and thus all pixels connected to the 240th data line group DLG240 may emit light.

In the Y coordinate field YCF, since the Y coordinate precision value is 4, j is set to 4 and n is set to 270, and accordingly, a third data output enable signal DE having 270 data pluses Y_DE1 to YDE270 for simultaneously applying the third data voltage to 1920 data lines in units of 4 gate lines may be generated, and the third gate output enable signal for applying the gate pulse GP in units of 4 gate lines using a row sequential method may be generated. Accordingly, the third data voltage may be sequentially applied to all pixels connected to a corresponding gate lines in units of j gate lines.

For example, while the first data pulse Y_DE1 included in the third data output enable signal is maintained in a high level, the gate pulse GP may be applied to first to fourth gate lines GL1 to GL4 corresponding to a first gate line group GLG1 and the third data voltage may be output to the all data lines DL1 to DL1920, and thus all pixels connected to the first gate line group GLG1 may emit light.

Continuously, while the second data pulse Y_DE2 included in the third data output enable signal is maintained in a high level, the gate pulse GP may be applied to fifth to eighth gate lines GL5 to GL8 corresponding to a second gate line group GLG2 and the third data voltage may be output to the all data lines DL1 to DL1920, and thus all pixels connected to the second gate line group GLG2 may emit light.

Lastly, while a 270th data pulse Y_DE270 included in the third data output enable signal is maintained in a high level, the gate pulse GP may be applied to 1077th to 1080th gate lines GL1077 to GL1080 corresponding a 270th gate line group GLG270 and the third data voltage may be output to all the data lines DL1 to DL1920, and accordingly, all pixels connected to a 270th gate line group GLG270 may emit light.

As a second example, assuming that a display panel has 1920×1080 pixels (or resolution of 1920×1080) and both the X coordinate precision value and the Y coordinate precision have 1 (or 1 pixel), in the display field DF, the first data output enable signal having 1920 data pulses DE_1 to DE_1920 and the first gate output enable signal for allowing 1080 gate lines to output gate pulses using a row sequential method may be generated. In this case, when each of data pulses included in the first data output enable signal is in a high level, the first data voltage may be applied in units of 1 data line.

In the X coordinate field XCF, a second data output enable signal having 1920 data pulses X_DE1 to X_DE1920 and a second gate output enable signal for simultaneously outputting gate pulses to 1080 gate lines may be generated. Accordingly, while the first data pulse X_DE1 included in the second data output enable signal is maintained in a high level, the gate pulse GP may be applied to all gate lines and the second data voltage may be output to the first data line DL1, and thus all pixels connected to the first data line DL1 may emit light.

Continuously, while the second data pulse X_DE2 is maintained in a high level, the gate pulse GP may be applied to all gate lines and the second data voltage may be output to the second data line DL, and thus all pixels connected to the second data line DL2 may emit light.

Lastly, while a 1920th data pulse X_DE1920 is maintained in a high level, the gate pulse GP may be applied to all gate lines and the second data voltage may be output to a 1920th data line DL1920, and thus all pixels connected to a 1920th data line DL1920 may emit light.

In the Y coordinate field YCF, the third data output enable signal DE having h data pulses Y_DE1 to YDEh for simultaneously applying a third data voltage to 1920 data lines in units of 1 gate line may be generated, and a third gate output enable signal for applying gate pulses in units of 1 gate line using a row sequential method may be generated. Thus, while the first data pulse Y_DE1 included in the third data output enable signal is maintained in a high level, the gate pulse GP may be applied to a first gate line GL1 and the third data voltage may be output to all of the data lines DL1 to DL1920, and thus all pixels connected to the first gate line GL1 may emit light.

Continuously, while the second data pulse Y_DE2 included in the third data output enable signal is maintained in a high level, the gate pulse GP may be applied to a second gate line GL2 and the third data voltage may be output to all of the data lines DL1 to DL1920, and thus all pixels connected to the second gate line GL2 may emit light.

Lastly, while a 1080th data pulse Y_DE1080 included in the third data output enable signal is maintained in a high level, the gate pulse GP may be applied to a 1080th gate line GL1080 and the third data voltage may be output to all the data lines DL1 to DL1080, and thus all pixels connected to a 1080th gate line GL1080 may emit light.

Figure 8:
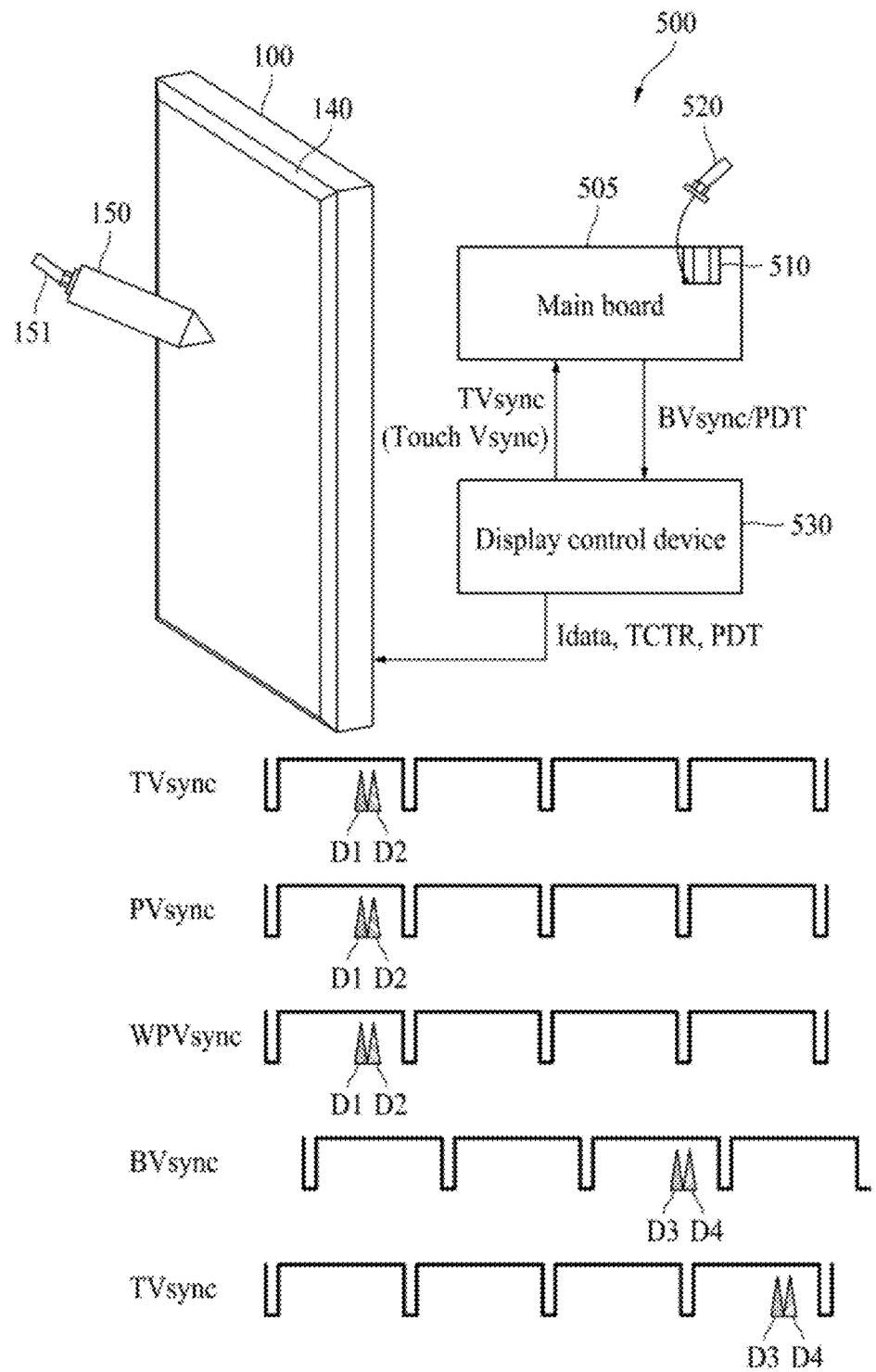
FIG. 8 is a block diagram of an electronic device including the display device shown in FIG. 1.

FIG. 8 is a block diagram of an electronic device including the display device shown in FIG. 1. An electronic device 500 may include the display device 100 including the display panel 140, a pen 150 (or an active pen) including a wireless transmitter 151, a main board 505 including a main chip 510, and a display control device 530.

Vertical synchronization signals of the main chip 510 and the pen 150 may be synchronized with each other through handshaking. Thus, the vertical synchronization signal of the main chip 510 may be synchronized with a touch vertical synchronization signal TVsync output from the display control device 530, and then the vertical synchronization signal of the main chip 510 may be lastly synchronized with the vertical synchronization signal of the pen 150. In this case, an internal vertical synchronization signal Int_Vsync of the timing controller 110 may also be synchronized with the touch vertical synchronization signal TVsync output from the display control device 530, and thus the vertical synchronization signal of the main chip 510 may also be synchronized with the internal vertical synchronization signal Int_Vsync of the timing controller 110.

The pen 150 may transmit X coordinates recognized in the X coordinate field XCF and Y coordinates recognized in the Y coordinate field YCF to a wireless receiver 520 connected to the main chip 510 through wireless transmitter 151.

The main chip 510 may convert the X coordinates and Y coordinates transmitted from the pen 150 into pattern data desired by a user. For example, when coordinates recognized (or determined) by the pen 150 on or above a first region in the display panel 140 is (100, 100), the main chip 510 may convert the coordinates (100, 100) transmitted from the pen 150 into pattern data (e.g., a point, a line, a figure, or a graphic user interface (GUI)) and may transmit the pattern data to the display control device 530.

The display control device 530 may transmit the pattern data to the display device 100. Thus, the display device 100 may display the pattern data (e.g., a point, a line, a figure, or GUI) in a first region corresponding to the coordinates (100, 100).

In FIG. 8, TVsync indicates a vertical synchronization signal transmitted to the main chip 510 from the display control device 530, PVsync indicates a vertical synchronization signal output from the wireless transmitter 151 of the pen 150, WPVSync indicates a vertical synchronization signal of the wireless receiver 520 of the main chip 510, BVsync indicates a vertical synchronization signal transmitted to the display control device 530 from the main chip 510, D1 indicates X coordinates, D2 indicates Y coordinates, and D3 and D4 indicate pattern data displayed on the display device 100.

It should be understood by those skilled in the art that the present disclosure can be embodied in other specific forms without changing the technical concept and essential features of the present disclosure.

All disclosed methods and procedures described herein may be implemented, at least in part, using one or more computer programs or components. These components may be provided as a series of computer instructions through any conventional computer-readable medium or machine-readable medium including volatile and nonvolatile memories such as random-access memories (RAMs), read only-memories (ROMs), flash memories, magnetic or optical disks, optical memories, or other storage media. The instructions may be provided as software or firmware, and may, in whole or in part, be implemented in a hardware configuration such as application-specific integrated circuits (ASICs), field-programmable gate arrays (FPGAs), digital signal processors (DSPs), or any other similar device. The instructions may be configured to be executed by one or more processors or other hardware configurations, and the processors or other hardware configurations are allowed to perform all or part of the methods and procedures disclosed herein when executing the series of computer instructions.

According to the present disclosure, touch coordinates of a pen that comes into contact with a display panel may be sensed using light emitted from a self-emission element included in a pixel of the display panel, and accordingly, needless to say, the display panel does not require a separate touch sensing device or touch IC for sensing touch coordinates, thereby realizing a compact display device and also reducing manufacturing costs of the display device.

According to the present disclosure, 1 frame duration may be time-divided, and emission data for acquiring touch coordinates of a pen that comes into contact with the display panel and image data for displaying an actual image may be output, thereby acquiring touch coordinates without degradation of image quality or resolution of an actual image.

According to the present disclosure, the number of pixels that is supposed to emit light for acquiring touch coordinates may be varied depending on the resolution and coordinate precision value of the display panel, thereby acquiring touch coordinates appropriate for the resolution of the display panel.

According to the present disclosure, color of emission data for acquiring touch coordinates may be randomly set, and thus the self-emission element may be prevented from being degraded due to repeated output of specific color only, and occurring ghost image due to emission with specific color may be prevented.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A timing controller for controlling emission of an emission element for recognizing touch coordinates, the timing controller comprising:
   a coordinate data generation circuit configured to generate X coordinate emission data for acquiring X coordinates and Y coordinate emission data for acquiring Y coordinates of the touch coordinates;
   a selection circuit configured to time-divide 1 frame duration, to output image data to a display driving circuit during a display field, to output the X coordinate emission data to the display driving circuit during an X coordinate field, and to output the Y coordinate emission data to the display driving circuit during a Y coordinate field; and
   a control data generation circuit configured to generate source control data and gate control data for outputting the image data, the X coordinate emission data, and the Y coordinate emission data to a display panel and to output the source control data and the gate control data to the display driving circuit,
   wherein the emission element is an organic light emitting diode (OLED).

2. The timing controller of claim 1, wherein, in the 1 frame duration, the X coordinate field is executed after the display field is executed, and the Y coordinate field is executed after the X coordinate field is executed.

3. The timing controller of claim 1, wherein, in the 1 frame duration, the Y coordinate field is executed after the display field is executed, and the X coordinate field is executed after the Y coordinate field is executed.

4. The timing controller of claim 1, wherein, in the 1 frame duration, the Y coordinate field is executed after the X coordinate field is executed, and the display field is executed after the Y coordinate field is executed.

5. The timing controller of claim 1, wherein, in the 1 frame duration, the X coordinate field is executed after the Y coordinate field is executed, and the display field is executed after the X coordinate field is executed.

6. The timing controller of claim 1, wherein:
   the display panel comprises w data lines and h gate lines;
   the source control data comprises a first data output enable signal comprising m data pulses for allowing each pixel to emit light in units of i (i being a natural number equal to or greater than 1) data lines using a first data voltage corresponding to the X coordinate emission data during the X coordinate field; and
   the gate control data comprises a first gate output enable signal for simultaneously outputting gate pulses to the h gate lines in response to each of the m data pulses.

7. The timing controller of claim 1, wherein:
   the display panel comprises w data lines and h gate lines;
   the source control data comprises a second data output enable signal comprising n data pulses for allowing each pixel to emit light in units of j (j being a natural number equal to or greater than 1) gate lines using a second data voltage corresponding to the Y coordinate emission data during the Y coordinate field; and
   the gate control data comprises a second gate output enable signal for sequentially outputting gate pulses synchronized with the n data pulses, respectively, in units of j gate lines during the Y coordinate field.

8. The timing controller of claim 1, wherein:
   the display panel comprises w data lines and h gate lines;
   the source control data comprises a third data output enable signal for allowing each pixel to sequentially emit light in units of 1 gate line during the display field; and
   the gate control data comprises a third gate output enable signal for allowing each pixel to sequentially emit light in units of 1 gate line during the display field.

9. The timing controller of claim 1, wherein the X coordinate emission data and the Y coordinate emission data have a grayscale value equal to or less than a predetermined reference to prevent emission of a pixel based on the X coordinate emission data and the Y coordinate emission data from being perceived by a user's eye.

10. The timing controller of claim 1, wherein the X coordinates are determined using a detection timing at which an emission signal due to emission of a pixel that comes into contact with a pen during the X coordinate field is detected, and the Y coordinates are determined using a detection timing at which an emission signal due to emission of the pixel that comes into contact with the pen during Y coordinate field is detected.

11. An electronic device comprising:
a display panel comprising a plurality of pixels;
a timing controller configured to time-divide 1 frame duration, to generate X coordinate emission data for acquiring X coordinates of touch coordinates and first control data during an X coordinate field, to generate Y coordinate emission data for acquiring Y coordinates and second control data during a Y coordinate field, and to generate third control data for outputting image data input from an outside during a display field; and
a display driving circuit configured to allow the pixel to emit light based on the X coordinate emission data according to the first control data during the X coordinate field, to allow the pixel to emit light based on the Y coordinate emission data according to the second control data during the Y coordinate field, and to allow the pixel to emit light based on the image data according to the third control data during the display field,
wherein each pixel comprises an organic light emitting diode (OLED).

12. The electronic device of claim 11, wherein, in the 1 frame duration, the X coordinate field is executed after the display field is executed, and the Y coordinate field is executed after the X coordinate field is executed.

13. The electronic device of claim 11, wherein, in the 1 frame duration, the Y coordinate field is executed after the display field is executed, and the X coordinate field is executed after the Y coordinate field is executed.

14. The electronic device of claim 11, wherein, in the 1 frame duration, the Y coordinate field is executed after the X coordinate field is executed, and the display field is executed after the Y coordinate field is executed.

15. The electronic device of claim 11, wherein, in the 1 frame duration, the X coordinate field is executed after the Y coordinate field is executed, and the display field is executed after the X coordinate field is executed.

16. The electronic device of claim 11, wherein:
the display panel comprises w data lines and h gate lines;
the first control data comprises a first data output enable signal comprising m data pulses for allowing each pixel to emit light in units of i (i being a natural number equal to or greater than 1) data lines using a first data voltage corresponding to the X coordinate emission data during the X coordinate field, and a first gate output enable signal for simultaneously outputting gate pulses to the h gate lines in response to each of the m data pulses; and the m is determined as a value obtained by dividing an X-direction resolution value of the display panel by an X coordinate precision value, and the X coordinate precision value is determined as a number of X-direction pixels to be recognized by a pen at one time among pixels included in the display panel.

17. The electronic device of claim 11, wherein:
the display panel comprises w data lines and h gate lines;
the second control data comprises a second data output enable signal comprising n data pulses for allowing each pixel to emit light in units of j (j being a natural number equal to or greater than 1) gate lines using a second data voltage corresponding to the Y coordinate emission data during the Y coordinate field, and a second gate output enable signal for sequentially outputting gate pulses synchronized with the n data pulses, respectively, in units of j gate lines during the Y coordinate field; and the n is determined as a value obtained by dividing a Y-direction resolution value of the display panel by a Y coordinate precision value, and the Y coordinate precision value is determined as a number of Y-direction pixels to be recognized by a pen at one time among pixels included in the display panel.

18. The electronic device of claim 11, further comprising:
a pen configured to acquire the touch coordinates via contact with the display panel,
wherein the pen determines the X coordinates using a first detection timing at which an emission signal of a pixel that comes into contact with the pen is detected during the X coordinate field, and determines the Y coordinates using a second detection timing at which an emission signal of a pixel that comes into contact with the pen is detected during the Y coordinate field.

19. The electronic device of claim 18, wherein the pen determines an ordinal number of a first target data pulse corresponding to a first detection timing of the emission signal among data pulses included in a first data output enable signal during the X coordinate field as the X coordinates, and determines an ordinal number of a second target data pulse corresponding to a second detection timing of the emission signal among data pulses included in a second data output enable signal in the Y coordinate field as the Y coordinates of the touch coordinates.

20. The electronic device of claim 19, wherein the ordinal number of the first target data pulse is determined using a time difference to the first detection timing from a rising edge of a vertical synchronization signal, and the ordinal number of the second target data pulse is determined using a time difference to the second detection timing from the rising edge of the vertical synchronization signal.

* * * * *